United States Patent [19]
Shibayama et al.

[11] Patent Number: 5,601,370
[45] Date of Patent: Feb. 11, 1997

[54] BUSH

[75] Inventors: Takayuki Shibayama; Masatoshi Inoue, both of Nagoya, Japan

[73] Assignee: Daido Metal Company Ltd., Nagoya, Japan

[21] Appl. No.: 500,249

[22] Filed: Jul. 10, 1995

[30] Foreign Application Priority Data

Jul. 18, 1994 [JP] Japan ..................... 6-188838

[51] Int. Cl.⁶ .................... F16C 27/00; F16C 33/02
[52] U.S. Cl. ................ 384/215; 384/276; 384/295
[58] Field of Search .................... 384/215, 276, 384/295, 428

[56] References Cited

U.S. PATENT DOCUMENTS

| | | | |
|---|---|---|---|
| 3,929,392 | 12/1975 | Ogino | 384/215 |
| 3,966,276 | 6/1976 | Bellarbre et al. | 384/215 |
| 4,988,217 | 1/1991 | Iijima | 384/276 X |

FOREIGN PATENT DOCUMENTS

| | | |
|---|---|---|
| 2406361A1 | 2/1974 | Germany . |
| 8130556 U | 10/1981 | Germany . |
| 55-40249 | 3/1980 | Japan . |

*Primary Examiner*—Thomas R. Hannon
*Attorney, Agent, or Firm*—Browdy and Neimark

[57] ABSTRACT

A bush is divided at a part of the circumference by a slit, so that at least two contacting portions provided on both end sides of the bush in the axial direction have elasticity in the radial direction, and are elastically brought into contact with the inner surface of a housing due to the elasticity. At least one elastic engagement portion between the at least two contacting portions has elasticity in the radial direction similar to the at least two contacting portions. The elastic engagement portion elastically engages with a rotary shaft which is inserted in the bush, thereby supporting the rotary shaft. Consequently, the rotary shaft rotates without vibration of the axis thereof.

6 Claims, 4 Drawing Sheets

US 5,601,370

BUSH

FIELD OF THE INVENTION

The present invention relates to a bush which rotatably supports a rotary shaft.

BACKGROUND OF THE INVENTION

A bush of a bearing, especially of a dry bearing, has a cylindrical body, and the inner surface of the bush serves as a bearing surface having an excellent sliding-contact property. The bush is fixed in a housing, and rotatably supports a rotary shaft inserted in the bush.

The rotary shaft supported by the bush has a diameter slightly smaller than an inner diameter of the bush and a clearance exists between the rotary shaft and the bearing surface of the bush such that the rotary shaft rotates smoothly. Consequently, the axis of the rotary shaft is vibrated, and errors occur in tooth engagement-contact and belt contact of gears and pulleys provided on end portions of the rotary shaft, thereby making it impossible to increase the mechanical accuracy. Moreover, the vibration causes other phenomena, for example, the rotary shaft collides with the inner surface of the bush and produces rattling noises.

A conventional technique known for preventing such an axis vibration is disclosed in JP-U-55-40249. In the conventional technique, as shown in FIG. 8, a bush 60 has a composite structure comprising an inner cylinder 61 made of resin and an outer cylinder 62 made of rubber provided on the outer periphery of the inner cylinder 61. Owing to a tightening force through the outer cylinder 62, the inner cylinder 61 is press-fitted on a rotary shaft S without forming a clearance therebetween, thus preventing vibration of the rotary shaft S. Also, even if the axis vibration occurs, vibration is absorbed by the buffer function of the outer cylinder 62, so that noises are not produced.

However, since the conventional bush 60 has the composite structure with the outer cylinder 62 provided on the inner cylinder 61, the structure is complicated, and also, the diameter of the bush 60 is increased by the thickness of the outer cylinder 62.

SUMMARY OF THE INVENTION

Thus, it is an object of the present invention to provide a bush having a simple and compact structure which nevertheless restrains vibration of the axis of a rotary shaft.

According to a first feature of the invention, there is provided a cylindrical bush comprising: an axially extending slit which divides the bush at a part of the circumference; a plurality of cuts circumferentially extending from the slit over a substantially half of the circumferential length of the bush so as to partially divide the bush in the axial direction; at least two contacting portions provided on at least both end sides of the bush in the axial direction, which are formed by the above cuts, the contacting portions being elastically brought into contact with the inner surface of a housing in which the bush is mounted; and at least one elastic engagement portion between the contacting portions, which is curved more inwardly than the contacting portions and elastically engages with a rotary shaft.

According to a second feature of the invention, there is provided a bush wherein the cuts partially divide the bush into three regions along the axial direction so that the contacting portions are provided on both end sides of the bush, and that an elastic engagement portion is provided between the contacting portions.

According to a third feature of the invention, there is provided a bush wherein the cuts divide the bush into five regions along the axial direction so that three contacting portions are provided on both end sides and in the middle of the both end sides, and that two elastic engagement portions are provided between the three contacting portions.

According to a fourth feature of the invention, there is provided a bush wherein a recess is provided to one of the both ends, which define the slit, of the respective contacting portion, and a projection is provided to the other end, which defines the slit together with the first end, of the respective contacting portion, which is fitted in the recess.

According to a fifth feature of the invention, there is provided a bearing structure comprising: a cylindrical bush having an axially extending slit which divides the bush at a part of the circumference, a plurality of cuts circumferentially extending from the slit over a substantially half of the circumferential length of the bush so as to partially divide the bush in the axial direction, at least two contacting portions provided on at least both end sides of the bush in the axial direction which are formed by the above cuts, the contacting portions being elastically brought into contact with the inner surface of a housing in which the bush is mounted, and at least one elastic engagement portion between the contacting portions, which engage with the peripheral surface of a rotary shaft; and a filler piece or a backup piece which is interposed between the inner surface of the housing and the outer surface of the elastic engagement portion.

Since the bush according to the first feature is divided at a part of the circumference by the slit, the at least two contacting portions provided on at least both end sides of the bush in the axial direction have elasticity in the radial direction, and are elastically brought into contact with the inner surface of the housing due to the elasticity. Also, the at least one elastic engagement portion between the contacting portions has elasticity in the radial direction similar to the contacting portions. The elastic engagement portion elastically engages with the peripheral surface of the rotary shaft which is inserted in the bush, thereby supporting the rotary shaft. Consequently, the rotary shaft rotates without vibration of the axis thereof.

In the bush according to the second feature, the cuts partially divide the bush into three regions along the axial direction, so that the contacting portions are provided on both end sides of the bush, and that the contacting portions are elastically brought into contact with the inner periphery of the housing. Also, the elastic engagement portion between the contacting portions elastically engage with the rotary shaft. Such structure of the bush is simple.

In the bush according to the third feature, the cuts partially divide the bush into five regions along the axial direction, so that three contacting portions are provided on both end sides and in the middle of the both end sides, reliably fixing the bush in the housing through the three-point support. Further, the rotary shaft can be steadily supported by the four elastic engagement portion.

In the bush according to the fourth feature, the contacting portions comprise the projections to be fitted in the recesses on the opposite ends, thereby preventing the bush from twisting in the axial direction.

In the bearing structure according to the fifth feature, even if a large force acts on the elastic engagement portions from the rotary shaft so as to expand them, the filler piece prevents expanding the elastic engagement portion, so that the rotary shaft is supported without large vibration during rotating.

According to the first to fourth features, the bush is divided at a part of the circumference by the slit extending in the axial direction, and has the at least two contacting portions and the at least one elastic engagement portion which are defined by the plurality of cuts extending from the slit position circumferentially over a substantially half of the circumferential length of the bush. In consequence, in spite of its compact and simple structure, the bush can well prevent the rotary shaft to vibrate radially, thereby improving mechanical accuracy of rotation of the rotary shaft and preventing generation of noises. Especially the bush according to the second feature is simplified in structure by including two contacting portion and one elastic engagement portion. The bush according to the third feature includes three contacting portions and two elastic engagement portions, thus supporting the rotary shaft more reliably. Further, the bush according to the fourth feature has the recesses and the projections to clinch such that the bush is not twisted around the axis.

The bearing structure according to the fifth feature includes the filler piece interposed between the inner surface of the housing and the outer surface of the elastic engagement portion so that even if a large force acts on the bush through the rotary shaft, the rotary shaft will not vibrate.

DESCRIPTION OF THE PREFERRED EMBODIMENTS

Embodiment 1

Figure 1:
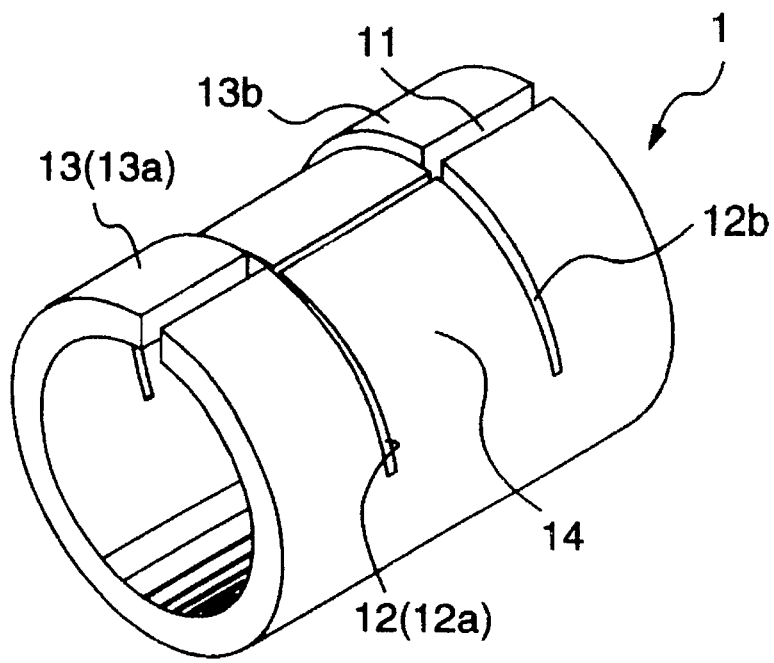
FIG. 1 is a perspective view of an embodiment of the invention.

A bush which supports a rotary shaft S extending horizontally in embodiment 1 of the present invention will be hereinafter described with reference to FIGS. 1 to 3.

The bush 1 is formed by bending a rectangular plate into a cylindrical shape. As shown in FIG. 1, both ends of the plate are opposite to each other and define a slit 11 therebetween, and one portion of the circumference of the bush 1 is divided by the slit 11 extending in the axial direction.

In the drawings, an upper part of the wall of the bush 1 is separated into three portions by cuts 12 (12a, 12b) which extend over a substantially half of the circumference. The slit 11 extends across the intermediate portions of the cuts 12. Thus, cylindrical contacting portions 13 (13a, 13b) are formed on both end sides of the bush 1, and an elastic engagement portion 14, which is curved more inwardly than the contacting portions 13, is formed between the contacting portions 13.

The contacting portions 13 has a circular cross-sectional shape which is slightly opened by the slit 11. When the bush 1 is decreased in diameter by narrowing the slit 11 and inserted into a housing H, as shown in FIG. 3, the contacting portions 13 elastically engage with the inner surface of the housing H and are fixed in place due to elasticity of the contacting portions 13. In consequence, a clearance δ is defined between the contacting portions 13 and the rotary shaft S.

Figure 2:
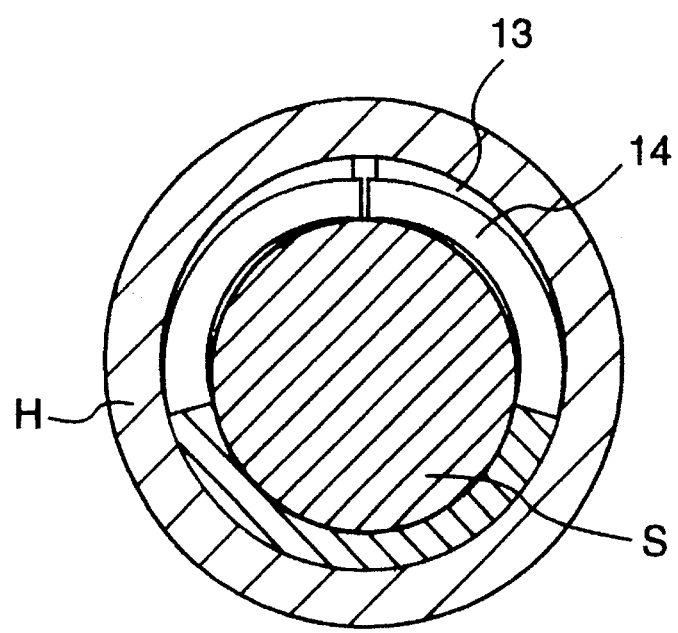
FIG. 2 is a cross-sectional view showing a state of use of the embodiment, taken along perpendicularly to the axis.
Figure 3:
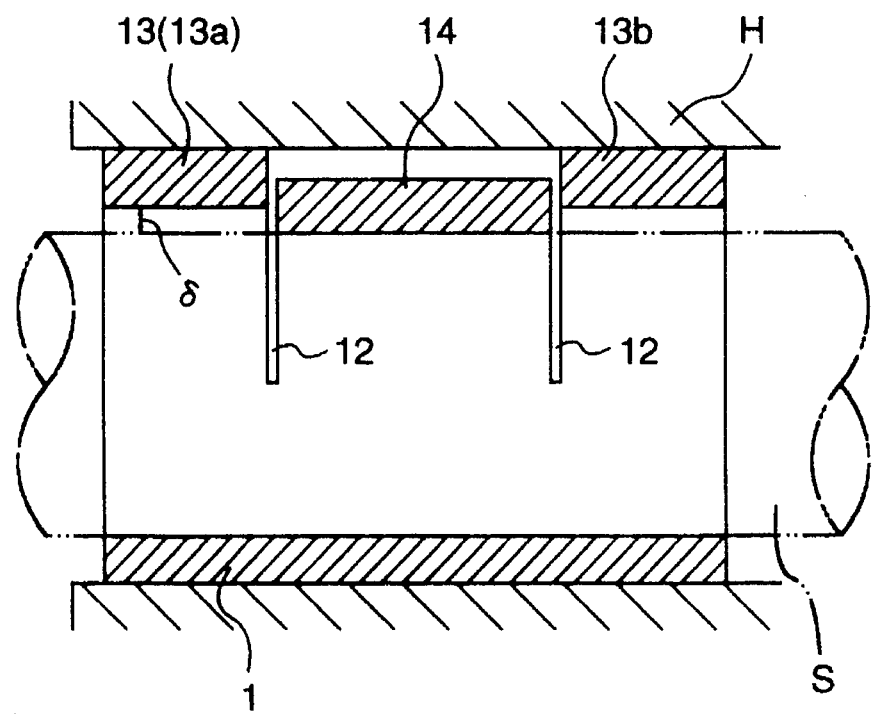
FIG. 3 is a cross-sectional view showing a state of use of the embodiment, taken along axially.

As shown in FIGS. 1 and 2, the elastic engagement portion 14, which is interposed between the two contacting portions 13a and 13b, is curved more inwardly than the contacting portions 13a and 13b and than the position of the clearance δ. Inside of the housing H, as shown in FIGS. 2 and 3, the elastic engagement portion 14 elastically engages with the peripheral surface of the rotary shaft S inserted therein.

Therefore, when the bush 1 is mounted in the housing H, the contacting portions 13a and 13b on both end sides of the bush 1 are press-fitted on the inner-peripheral surface of the housing H and fixed in place due to the total elasticity of the contacting portions 13a and 13b, and also, the elastic engagement portion 14 elastically contacts with the peripheral surface of the rotary shaft S and supports the rotary shaft S. Consequently, if a force affects the rotary shaft S to vibrate its axis, vibration of the axis is restrained by the elasticity of the elastic engagement portion 14. If the elastic engagement portion 14 is worn by frictional slide contact with the rotary shaft S, the elastic engagement portion 14 is kept pressed by the inward elasticity without being detached from the rotary shaft S. Accordingly, the rotary shaft S rotates without vibration of the axis, which results in accurate rotations of gears or pulleys (not shown) provided on end portions of the rotary shaft S. Moreover, the rotary shaft S rotates without noises generated by vibration of the axis. When the rotary shaft S is inserted into the bush 1 which is fixed in the housing H, the elastic engagement portion 14 is expanded by a chamfered portion on an end surface of the rotary shaft S though not shown, so that the rotary shaft S can be inserted into the housing simply by pressing it without special operation.

Especially in the embodiment 1, the cylindrical bush 1 is partially divided to three portions along the axial direction, and the bush 1 is fixed on the inner-peripheral surface of the housing H by the two contacting portions 13a and 13b at both end sides while the rotary shaft S is elastically pressed and supported by the elastic engagement portion 14 provided in the middle, thereby simplifying the structure of the bush 1.

In the embodiment 1, the rotary shaft S is supported horizontally. However, when the rotary shaft S is supported vertically, the elastic engagement portion 14 elastically presses the rotary shaft S, thereby preventing vibration of the axis.

Embodiment 2

A bush 2 in embodiment 2 of the invention will now be described with reference to FIG. 4.

In substantially the same manner as embodiment 1, the bush 2 of embodiment 2 is formed by bending a rectangular plate into a cylindrical shape. A slit (not shown) extends in an upper part of the bush 2 in the axial direction so that the bush 2 is divided at a part of the circumference to produce elasticity in the circumferential direction.

Figure 4:
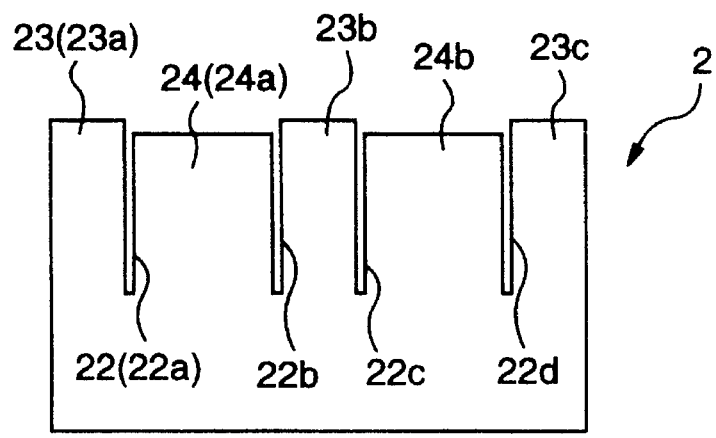
FIG. 4 is a front view of a second embodiment of the invention.

In FIG. 4, the upper part of the bush 2 is partially divided to five portions by four cuts 22 (22a, 22b, 22c, 22d) which extend over a substantially half of the circumference. Thus, contacting portions 23 (23a, 23b, 23c) are formed on both sides and in the middle of the bush 2, and elastic engagement portions 24 (24a, 24b) which are curved more inwardly than the contacting portions 23 are formed between the contacting portions 23a and 23b and the contacting portions 23b and 23c, respectively. The contacting portions 23 and the elastic engagement portions 24 have substantially the same cross-sectional shapes as in embodiment 1. Therefore, when the bush 2 is inserted into a housing H, the bush 2 is press-fitted against the inner-peripheral surface of the housing H by elasticity of the contacting portions 23. A rotary shaft S is pressed and supported by the elastic engagement portions 24, so that even if a force affects on the rotary shaft S to vibrate its axis, vibration of the axis is restrained by the elasticity of the elastic engagement portions 24.

Especially in embodiment 2, the bush 2 is fixed by the three contacting portions 23a, 23b and 23c, which ensure steady fixing of the bush 2. Also, the rotary shaft S is elastically supported by the two elastic engagement portions 24a and 24b, thereby providing a reliable bearing structure in which the rotary shaft S is steadily press-fitted and supported. In embodiment 2, the four cuts 22a, 22b, 22c and 22d are formed. However, more cuts may be formed to provide more contacting portions and more elastic engagement portions.

Embodiment 3

Figure 5:
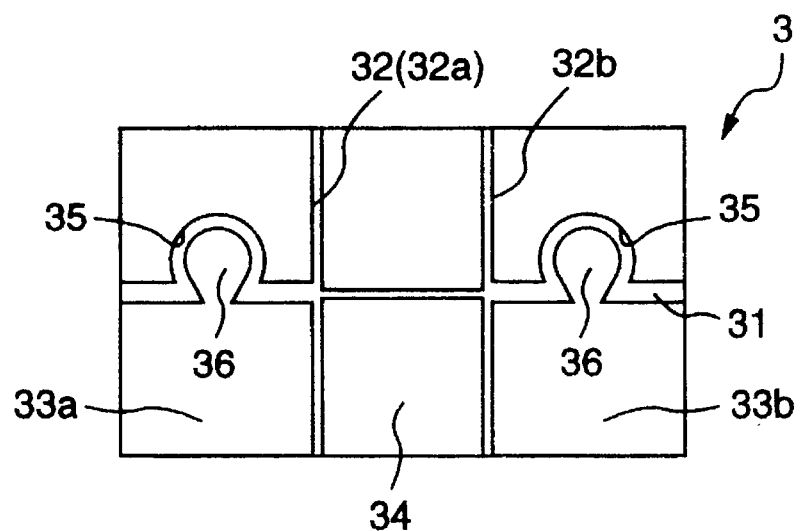
FIG. 5 is a plan view of a third embodiment of the invention.

Next, a clinch-type bush 3 in embodiment 3 of the invention will be described with reference to FIG. 5. In substantially the same manner as embodiment 1, the bush 3 is formed by bending a rectangular plate into a cylindrical shape. A slit 31 extends in the bush 3 in the axial direction, and a substantially half circumferential range of the bush 3 is partially divided to three portions by cuts 32 (32a, 32b). Thus, contacting portions 33a, 33b are formed on both sides of the bush 3, and an elastic engagement portion 34 which is curved more inwardly is formed between the contacting portions 33a and 33b.

This embodiment is different from embodiment 1 in that the contacting portions 33a and 33b include recesses 35 formed on one side of the slit 31, and projections 36 formed at corresponding positions on the other side of the slit 31, the projections 36 being fitted in the recesses 35.

Consequently, if a force affects on the bush 3 so as to twist it around the axis, the engagement of the projections 36 and the recesses 35 restrain twisting of the bush 3. As a result, in the grinding step of the manufacture of the bush 3, grinding operation can be easily performed. Further, when the bush 3 is fitted in a housing H, even if a rotary shaft moves axially, the bush 3 can be prevented from twisting.

Embodiment 4

Figure 6:
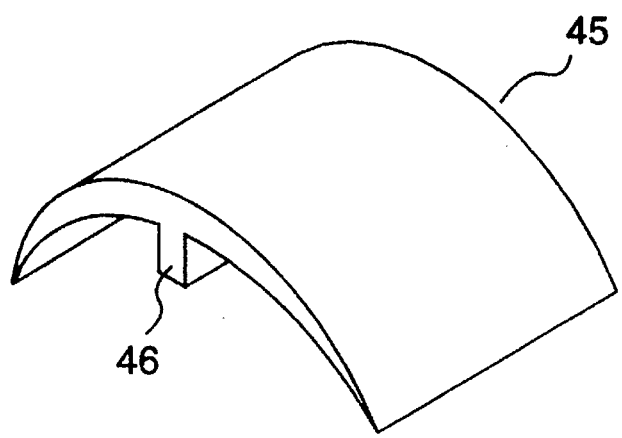
FIG. 6 is a perspective view of a filler piece of a fourth embodiment of the invention.
Figure 7:
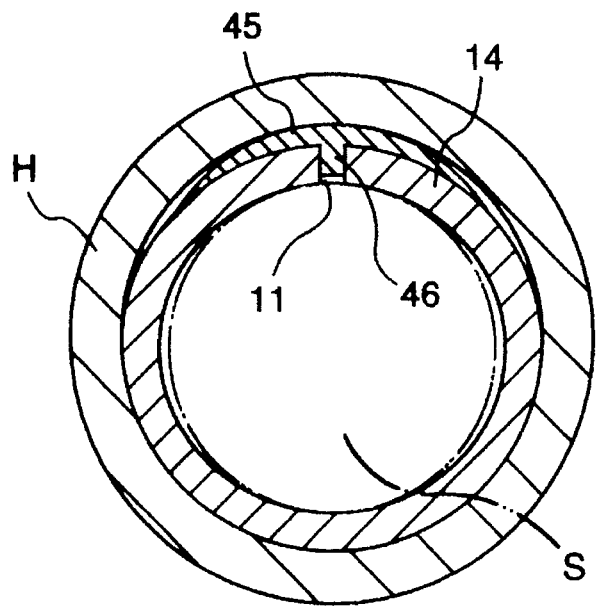
FIG. 7 is a cross-sectional view showing a state of use with respect to the fourth embodiment, taken along perpendicularly to the axis.
Figure 8:
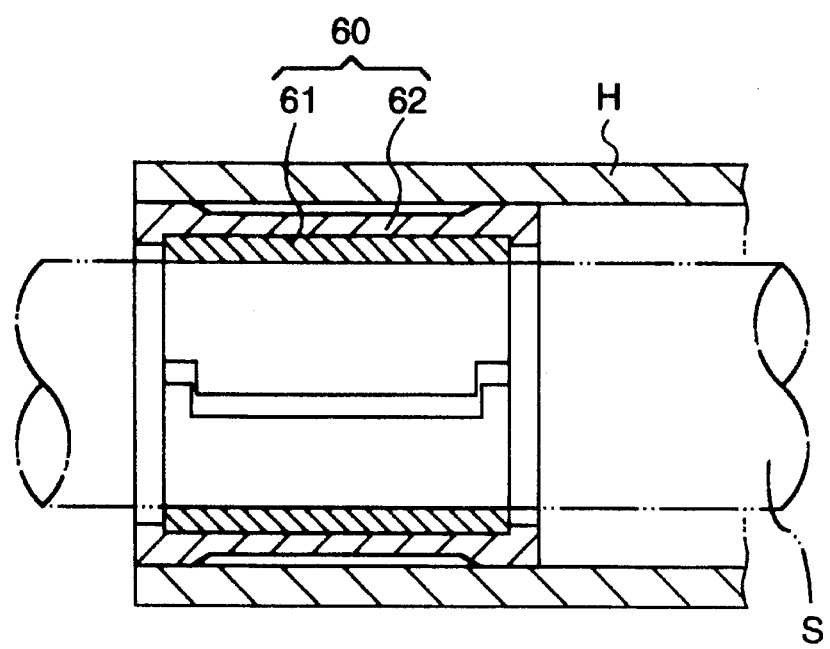
FIG. 8 is a cross-sectional view showing a prior art bush, taken along axially.

Embodiment 4 of the invention is a bush 4 used for a bearing structure for high-load application. As shown in FIGS. 6 and 7, a filler piece 45 is attached to the bush 4 which is formed in substantially the same manner as embodiment 1. Since the bush 4 has the same structure as that of the embodiment 1, the description thereof will be omitted, and the filler piece 45 and its function will be described.

The filler piece 45 is molded of an elastic synthetic resin of urethane, nylon or the like in the form of a plate having a thin, substantially crescent cross-sectional shape, as shown in FIG. 6. The filler piece 45 has a shape corresponding to a substantially crescent gap defined between an elastic engagement portion 14 of the bush 4 and the inner-peripheral surface of a housing H, as shown in FIG. 7. Also, a length of the filler piece 45 corresponds to a length of the elastic engagement portion 14, so that the filler piece 45 can be closely fitted on the rear surface of the elastic engagement portion 14. A fitting 46 to be held in a slit 11 is formed in the intermediate portion of the inner surface of the filler piece 45, thereby engaging the filler piece 45 in the substantially crescent gap.

When the bush 4 is fixed in the housing H, the filler piece 45 is interposed in the gap between the housing H and the elastic engagement portion 14, and the filler piece 45 supports the rear surface of the elastic engagement portion 14. Therefore, even if a large force affects a rotary shaft S to jump it upwardly, the elastic engagement portion 14 is elastically supported from the rear side by the filler piece 45 so that rotary shaft S can be prevented from jumping of large vibration.

In embodiment 4, the filler piece 45 is interposed in the clearance between the housing H and the rotary shaft S. Consequently, even if a larger jumping force than elasticity of the elastic engagement portion 14 is applied, the filler piece 45 which supports the rear side of the elastic engagement portion 14 serves to press the rotary shaft S elastically and to prevent it from jumping upwardly. Thus, there can be provided a bearing structure in which large vibration of the rotary shaft S does not occur.

What is claimed is:

1. A bearing structure comprising:

a bush having an axially extending slit which divides the bush at a part of the circumference, a plurality of cuts extending from the slit in a circumferential direction of the bush over a substantially half of the circumferential length of the bush so as to partially divide the bush in the axial direction, at least two contacting portions provided on at least both end sides of the bush, said contacting portions being elastically brought into contact with the inner surface of a housing in which the bush is mounted, and at least one elastic engagement portion provided between the contacting portion, which elastically engage with a rotary shaft; and a filler piece which is interposed between the inner surface of the housing and the outer surface of the elastic engagement portions.

2. The bearing structure according to claim 1, wherein the bush comprises a recess at one of the both ends, which define the slit, of the respective contacting portion, and a projection at the other end, which defines the slit together with the first end, of the respective contacting portion, which is fitted in the recess.

3. The bearing structure according to claim 1, wherein the contacting portions of the bush are formed by the cuts and are provided in the axial direction.

4. The bearing structure according to claim 1, wherein the engagement portion is curved more inwardly than the contacting portions.

5. The bearing structure according to claim 1, wherein the cuts partially divide the bush along the axial direction into at least three regions, such that the at least two contacting portions are provided one on either side of the bush.

6. The bearing structure according to claim 1, wherein the filler piece is crescent-shaped in cross section and comprises elastic synthetic resin.

* * * * *